(12) United States Patent
Beck et al.

(10) Patent No.: US 10,323,991 B2
(45) Date of Patent: Jun. 18, 2019

(54) DEVICE FOR LOCAL TEMPERATURE MEASUREMENT, ASSOCIATED CELL AND METHOD FOR USE

(71) Applicants: ELECTRICITE DE FRANCE, Paris (FR); LABORATOIRE NATIONAL DE METROLOGIE ET D'ESSAIS (LNE), Paris (FR)

(72) Inventors: Yves-Laurent Beck, La Tronche (FR); Patrick Sollet, Mainvilliers (FR)

(73) Assignees: ELECTRICITE DE FRANCE, Paris (FR); LABORATOIRE NATIONAL DE METROLOGIE ET D'ESSAIS (LNE), Paris (FR)

( * ) Notice: Subject to any disclaimer, the term of this patent is extended or adjusted under 35 U.S.C. 154(b) by 170 days.

(21) Appl. No.: 15/533,743

(22) PCT Filed: Dec. 2, 2015

(86) PCT No.: PCT/FR2015/053295
§ 371 (c)(1),
(2) Date: Jun. 7, 2017

(87) PCT Pub. No.: WO2016/092181
PCT Pub. Date: Jun. 16, 2016

(65) Prior Publication Data
US 2017/0336270 A1 Nov. 23, 2017

(30) Foreign Application Priority Data
Dec. 8, 2014 (FR) .................................... 14 62067

(51) Int. Cl.
*G01K 5/00* (2006.01)
*G01K 1/00* (2006.01)
(Continued)

(52) U.S. Cl.
CPC ............. *G01K 15/002* (2013.01); *G01K 1/14* (2013.01); *G01K 1/16* (2013.01); *G01K 7/16* (2013.01);
(Continued)

(58) Field of Classification Search
USPC .......................................... 374/1, 3, 208, 164
See application file for complete search history.

(56) References Cited

U.S. PATENT DOCUMENTS 3,350,915 A * 11/1967 Staffin .................. G01K 15/005
165/104.16
3,499,310 A    3/1970 Hundere et al.
(Continued)

FOREIGN PATENT DOCUMENTS

GB    2 181 830 A    4/1987
GB    2 210 451 A    6/1989
(Continued)

*Primary Examiner* — Mirellys Jagan
(74) *Attorney, Agent, or Firm* — Drinker Biddle & Reath LLP

(57) ABSTRACT

A device for local temperature measurement that is suitable for taking temperature measurements of an immediate vicinity of said device. The device comprises: a cell comprising a heat-conductive base and at least one first material having a predetermined fixed state-change temperature and arranged in said base; a heat-energy transfer device thermally connected to said base and said at least one first material; a local temperature measurement probe received in said base and in thermal contact with said at least one first material, the heat-energy transfer device being suitable for causing a change of state of said first material in order to carry out at least one metrological verification of the local temperature measurement probe. An associated cell and method for use are also provided.

15 Claims, 4 Drawing Sheets

(51) Int. Cl.
*G01K 15/00* (2006.01)
*G01K 1/14* (2006.01)
*G01K 1/16* (2006.01)
*G01K 7/16* (2006.01)
*G01K 11/06* (2006.01)
*G01K 17/16* (2006.01)

(52) U.S. Cl.
CPC ............ *G01K 11/06* (2013.01); *G01K 15/005* (2013.01); *G01K 17/16* (2013.01)

(56) References Cited

U.S. PATENT DOCUMENTS

| | | | |
|---|---|---|---|
| 4,627,740 A | 12/1986 | Jerde et al. | |
| 5,825,804 A | 10/1998 | Sai | |
| 6,939,035 B2 * | 9/2005 | Machin | G01K 15/002 250/252.1 |
| 7,063,457 B2 * | 6/2006 | Kang | G01K 15/002 374/1 |
| 7,529,434 B2 | 5/2009 | Taverner et al. | |
| 7,909,504 B2 * | 3/2011 | Sjogren | G01K 15/005 374/1 |
| 2008/0013591 A1 | 1/2008 | Kim et al. | |

FOREIGN PATENT DOCUMENTS

| | | |
|---|---|---|
| JP | 2001-201406 A | 7/2001 |
| WO | 2010/036360 A2 | 4/2010 |

\* cited by examiner

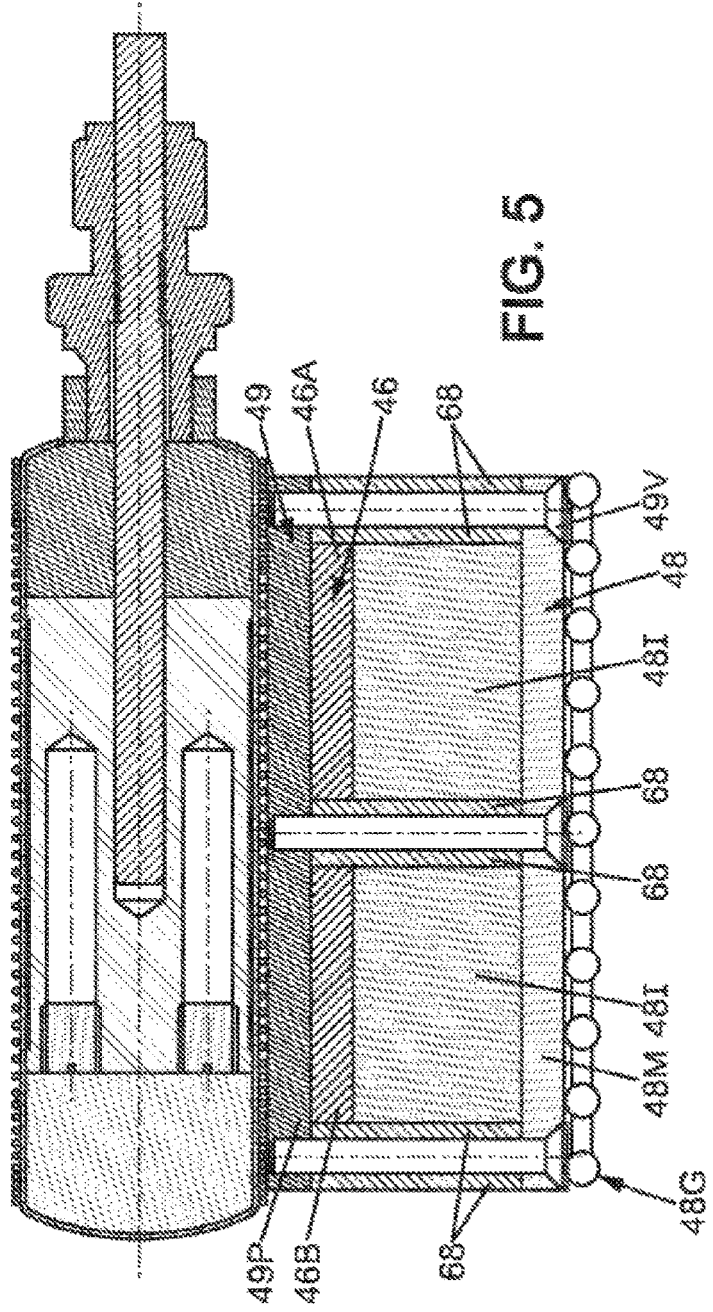

DEVICE FOR LOCAL TEMPERATURE MEASUREMENT, ASSOCIATED CELL AND METHOD FOR USE

CROSS-REFERENCE TO RELATED APPLICATIONS

This application is the U.S. national phase of the International Patent Application No. PCT/FR2015/053295 filed Dec. 2, 2015, which claims the benefit of French Application No. 14 62067 filed Dec. 8, 2014, the entire content of which is incorporated herein by reference.

BACKGROUND

The invention relates to a device for local temperature measurement.

Such devices are intended to measure temperatures of an extended but limited area corresponding to their immediate vicinity. Some of these measure temperatures of an object by being placed in contact with it. This is then referred to as contact temperature measurement.

In a known manner, devices for temperature measurement are prone to drift over time. Such drift leads to temperature measurements that are significantly different from the actual temperature they are supposed to measure. This drift phenomenon must be regularly assessed, for example in order to correct the temperature measurements obtained.

These operations are generally implemented by physically accessing the measurement device and performing the necessary operations in-situ.

This approach has disadvantages, however.

Indeed, in some contexts of use, access to the measurement device may be difficult or impossible. This is the case with what are called inaccessible probes, intended to be embedded in a structure where they are to measure its temperature and to remain there for their entire service life.

The invention aims to improve the situation.

SUMMARY

To this end, the invention concerns a device for local temperature measurement that is suitable for obtaining temperature measurements of the immediate vicinity of said device, said device comprising:
  a cell comprising a thermally conductive base and at least a first material having a predetermined fixed state-change temperature and arranged in the base,
  a thermal energy transfer device thermally connected to the base and to the at least first material,
  a local temperature measurement probe arranged in the base and in thermal contact with the at least first material,
  the thermal energy transfer device being adapted to cause a change of state of the first material in order to carry out at least one metrological verification of the local temperature measurement probe.

It is thus possible to track drifts in the local temperature measurement probe without needing access to the device. This facilitates correcting for drifts in the temperature probe over time.

According to one aspect of the invention, the measurement device comprises a protective sheath encapsulating the base, so that the device for local temperature measurement is adapted to be received in a lasting manner in a receiving structure and to be inaccessible within said receiving structure.

This is particularly advantageous in that one can thus track drifts in probes which are not possible to access during their service life.

According to another aspect of the invention, the cell thermally connects the local temperature measurement probe to said immediate vicinity so that the cell enables the obtaining of temperature measurements representative of the temperature of said immediate vicinity, by the local temperature measurement probe received in the base.

According to another aspect of the invention, the device for local temperature measurement is adapted to allow metrological verification of the local temperature measurement probe based on a temperature measured by the local temperature measurement probe during the change of state of the first material and on the predetermined fixed state-change temperature.

This allows monitoring for drifts in the temperature probe in a simple manner.

In one embodiment, the device comprises at least first and second materials arranged in the base and having at least a first, respectively a second predetermined fixed state-change temperature, the thermal energy transfer device being adapted to cause a change of state of the first and second materials, the device for local temperature measurement being adapted to allow correcting temperature measurements provided by the local temperature measurement probe based on temperatures measured by the local temperature measurement probe during respective state changes of the first and second materials and on the first and second predetermined fixed state-change temperatures.

Thus, not only is it possible to assess the drifts of the temperature probe, but it is also possible to correct the measurements it provides, in a simple manner.

According to another aspect of the invention, the device comprises a heating module comprising a resistive wire wound around the cell.

This allows heating the cell in a simple and reliable manner.

According to another aspect of the invention, the resistive wire defines a winding having a variable pitch along an axis of the cell.

This allows heating different portions of the cell differently, which helps compensate for the non-uniformity of the temperature distribution within the cell.

According to another aspect of the invention, the winding has a pitch equal to a first value over a central portion of the cell and a second value, less than the first value, over end portions of the cell.

This allows improving the uniformity of the temperature within the cell by compensating for heat losses occurring at the ends of the cell.

According to another aspect of the invention, the thermal energy transfer device comprises a cooling module and a heat exchanger configured to remove heat generated by the cooling module during operation of the cooling module.

This reduces the impact of the heat so generated on the cell.

According to another aspect of the invention, the device further comprises thermal insulating means configured for maintaining a uniform temperature within the cell and for limiting heat loss at the ends of the cell.

According to another aspect of the invention, the thermal insulating means comprise at least one insulating block bearing against one of the end faces of the base.

According to another aspect of the invention, the insulating means comprise an insulating jacket surrounding a central portion of the base.

The invention also relates to a cell for a device for local temperature measurement as defined above, the cell comprising a thermally conductive base, at least one housing for receiving a first material having a predetermined state-change temperature, and a hole for receiving a local temperature measurement probe.

According to one aspect of the invention, the cell comprises a protective sheath encapsulating the base, such that the device for local temperature measurement is adapted to be received in a lasting manner in a receiving structure and to be inaccessible within said receiving structure.

The invention also relates to a method for using a device for local temperature measurement as defined above, wherein:
- a change of state of the first material is caused by the thermal energy transfer device.
- temperature measurements are carried out during said change of state, using the local temperature measurement probe,
- a measured state-change temperature is determined based on temperature measurements measured during said change of state, and
- a metrological verification of the local measurement probe or a correction of a temperature measurement obtained by the local temperature measurement probe is carried out based on at least the predetermined fixed state-change temperature and the determined measured state-change temperature.

According to another aspect of the invention, during the method:
- a change of state of the second material is also caused by the thermal energy transfer device,
- temperatures measurements are also carried out during the change of state of the second material, using the local temperature measurement probe,
- a measured state-change temperature is determined for the second material, based on temperatures measured during the change of state of the second material,
- a correction of a measurement obtained by the local temperature measurement probe is carried out based on predetermined fixed state-change temperatures of the first and second materials and the measured state-change temperatures of the first and second materials.

According to another aspect of the invention, during the method as defined above, for the determination of a measured state-change temperature, the derivative of the temperatures measured by the local temperature measurement probe during the change of state is determined, start and end times of the change of state are determined from the derivative of the temperatures measured, and the measured state-change temperature is determined as the average of the temperatures measured by the local temperature measurement probe between the start and end times of the change of state.

BRIEF DESCRIPTION OF THE DRAWINGS

The invention will be better understood by reading the detailed description that follows, given solely by way of example and with reference to the appended Figures, in which:

FIG. 5 illustrates a variant of the device for temperature measurement according to the invention.

DETAILED DESCRIPTION

Figure 1:
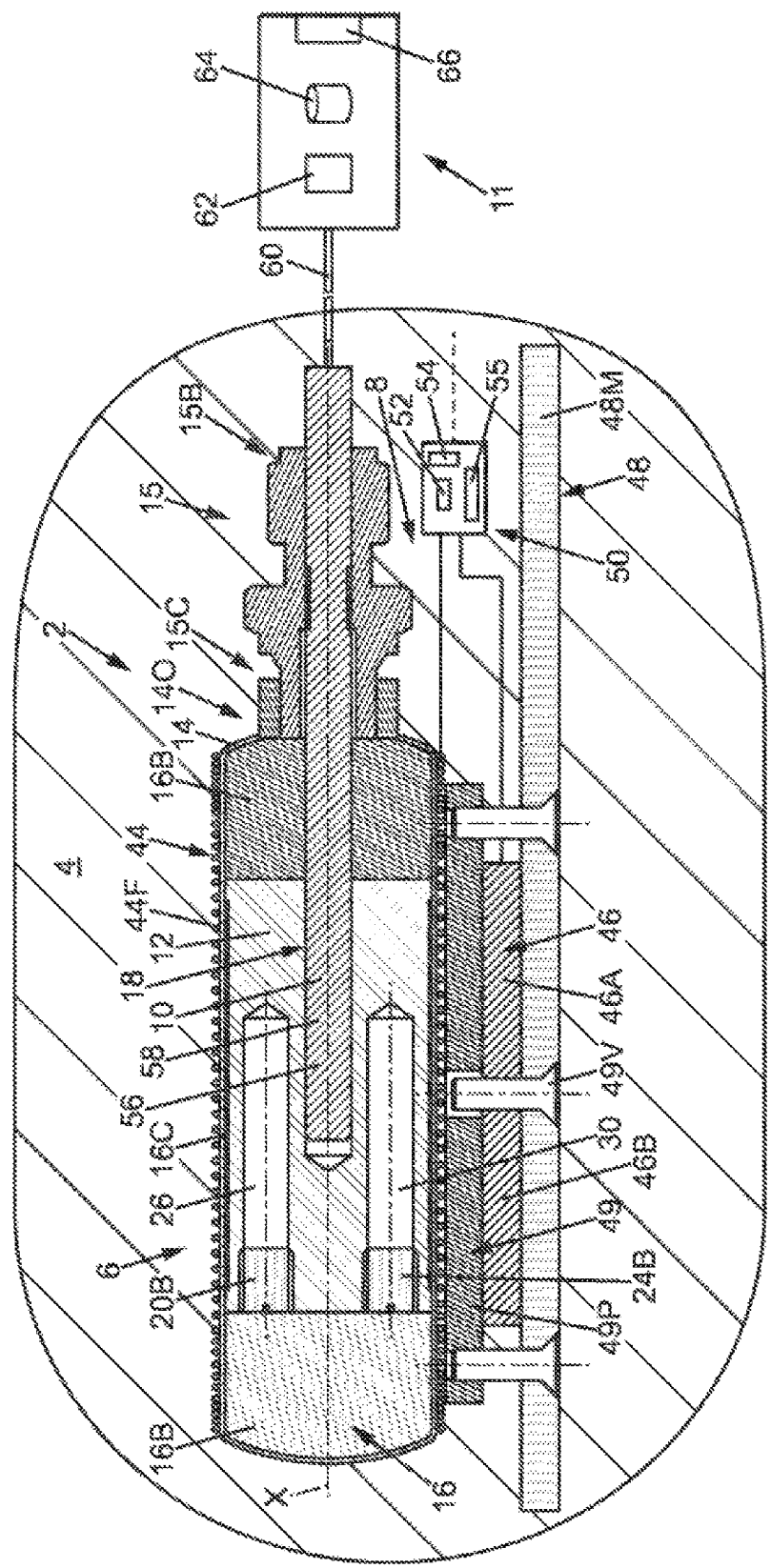
FIG. 1 illustrates a device for local temperature measurement according to the invention.

FIG. 1 illustrates a device for local temperature measurement 2 according to the invention, hereinafter the device 2.

"Local measurement" is understood to mean that the device 2 is configured to measure temperatures of a limited extended area around the device 2 and corresponding to the immediate environment of the device 2. In particular, the concept of local measurement is in contrast to the concept of distributed measurement which corresponds to a measurement performed over an extended area, for example at a plurality of spatially dispersed points. This type of measurement is provided in particular by optical fibers for measuring temperatures.

Preferably, the device 2 is a contact temperature measurement device. In other words, the device 2 measures the temperature of an object with which it is in contact. In particular, the device 2 is designed to be embedded in a receiving structure 4 with which it is in contact, and to remain within this structure 4 in a lasting manner. In some embodiments, the device 2 is designed to be inaccessible throughout its service life once placed in the receiving structure 4. However, alternatively, the device 2 is designed to be retrievable during its service life, for example for maintenance.

The receiving structure 4 is a material of a facility or equipment comprised within the group formed by: a civil engineering structure, any facility or equipment of a power station, a machine, a piping facility or equipment, a drill, a radioactive facility or equipment, a structure comprising geomaterials.

The material in question is, for example, comprised within the group consisting of: soil, concrete, air, a polymer, a metal.

Referring to FIG. 1, the device 2 comprises a fixed-point cell 6, hereinafter referred to as the cell 6, a thermal energy transfer device 8, a local temperature measurement probe 10 received in the cell 6, and an acquisition module 11.

The cell 6 is adapted to generate a change of state of at least one material, referred to as fixed point, that it comprises.

Moreover, the cell 6 is designed to allow obtaining temperature measurements of the structure 4 by the local temperature probe 10 through the cell 6, these measurements being representative of the actual temperature of the structure 4 in the vicinity of the device 2. For this purpose, the cell 6 thermally connects the probe 10 to the structure 4.

The cell 6 has lengthwise dimensions of the same order of magnitude as the length of a sensitive portion of the probe 10, this portion being received in the cell 6. For example, the ratio between the length of the cell 6 and the length of the sensitive portion of the probe 10 is between 1 and 10. In addition, the ratio between the height of the cell 6 and the height of the sensitive portion of the probe 10 is less than or equal to 10.

For example, the cell 6 has a length that is less than or equal to 10 cm, and has a height that is less than or equal to 6 cm.

These dimensional considerations have the effect of improving the thermal coupling between the probe 10 and the structure 4, and thus facilitate the temperature measurements of the structure 4 through the cell 6 by the probe 10. These dimensions make it so the cell only represents a small amount of material with little interference with the temperature field of the structure 4.

This has the effect of improving the thermal response of the cell 6 to temperature variations of the structure 4, which reduces the time required for the probe 10 to measure a temperature change occurring within the structure 4.

For example, the thermal response of the device 2, which corresponds to the speed at which the probe 10 is able to measure the temperature of the structure 4 when it changes, is less than a minute.

Furthermore, these dimensional considerations simplify integration of the device 2 into the structure 4.

Figure 2:
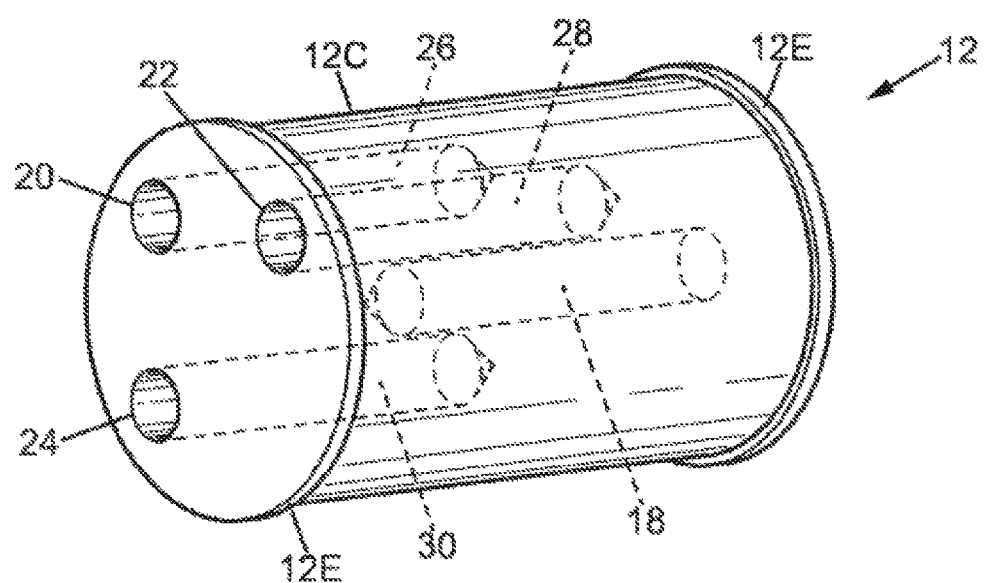
FIG. 2 illustrates a perspective view of a base of the device of FIG. 1.

Referring to FIGS. 1 and 2, the fixed-point cell 6, hereinafter the cell 6, comprises a thermally conductive base 12, a protective sheath 14, and means 16 of thermal insulation.

The base 12 is adapted for thermally connecting the probe 10 to the structure 4 so that the probe 10 can measure the temperature of the structure 4. The base 12 is made of a material which is a good thermal conductor. For example, the base 12 is made of graphite. For example, the graphite used is a grade IG-510 graphite marketed by Toyo Tanso. This material is of particular interest because of its low porosity. This has the effect of reducing or even eliminating a possible contamination of the state-changing materials it contains by the base 12 or by other materials and thus preventing any drift in the fixed temperature of these state changes over time. This is described in more detail below. Alternatively, the base 12 is made of aluminum, copper, or any other material having good thermal conductivity and not contaminating the state-changing materials.

The base 12 has a generally cylindrical shape about axis X. The base 12 has a substantially circular cross-section. In the example of FIGS. 1 and 2, this cross-section is generally circular. Alternatively, the base 12 has a rectangular cross-section.

The base 12 has a central portion 12C and two end portions 12E. These portions are coaxial with axis X. The central portion 12C has a diameter slightly less than that of the end portions 12E, which are of the same diameter.

Still referring to FIGS. 1 and 2, the base 12 comprises a hole 18 for receiving the probe 10. The hole 18 has a generally cylindrical shape with an axis parallel to axis X. The hole 18 is arranged for example at the center of the base 12, its axis then substantially corresponding to axis X. The dimensions and shape of the hole 18 are complementary to the dimensions and shape of a sensitive portion of the probe 10, described in detail hereinafter. The hole 18 is blind, meaning that it is not a hole through the entire base. Alternatively, the hole 18 is a through-hole. It is then coupled to a plug provided for sealing the hole 18 at the end opposite the hole end into which the probe 10 is inserted.

The base 12 also comprises three housings 20, 22, 24. These housings are substantially cylindrical and parallel to axis X. Each housing 20, 22, 24 respectively receives a first, a second, and a third material 26, 28, 30. The materials 26, 28, 30 are thermally connected to the probe 10 and to the thermal transfer device 8 by the base 12.

These materials 26, 28, 30 are different from one another. Each of these materials forms a fixed point of the device 2, in other words a material for which its state-change temperature, which is known and fixed, is used as a reference temperature. These materials 26, 28, 30 each have a predetermined state-change temperature T1, T2, T3 within the range of temperatures that the device 2 is intended to measure.

In practice, the context where the device 2 is used determines the choice of the three materials 26, 28, 30. For example, for an operating range of the device 2 substantially corresponding to the range [−10° C.; 100° C.], we choose the following three materials: the first material 26 is water (which has a melting point substantially equal to 0° C.), the second material 28 is a binary alloy of gallium-bismuth having a melting point substantially equal to 29.5° C., and the third material 30 is a binary alloy of bismuth-indium having a melting point substantially equal to 72.7° C.

More specifically, the gallium-bismuth alloy substantially comprises 99.78% gallium and 0.22% bismuth by weight. Furthermore, the bismuth-indium alloy substantially comprises 33.3% bismuth and 66.7% indium by weight.

For example, the housing 22 for the second material 28 contains about 1.8 g of gallium-bismuth alloy. Furthermore, housing 24 contains approximately 2 g of bismuth-indium alloy.

Note that in practice, the value of these weights is determined by the dimensions of the probe 10.

Furthermore, the device 2 according to the invention is particularly advantageous within the temperature range [−20° C., 250° C.].

As will be seen below, during operation of the device 2, a change of state of one or more of these three fixed points 26, 28, 30 for which the melting (or solidification) point is known is induced in order to measure a drift of the probe 10 and/or correct the measurements.

Note also that the evolution over time of the properties of the materials 26, 28, 30, in particular their state-change temperature, is analyzed beforehand and is therefore known.

Preferably, the materials 26, 28, 30 are materials having low supercooling. In a known manner, supercooling is a transient phenomenon in which a material may not change state even when its temperature reaches its state-change temperature. For example, because of this phenomenon, water may be in a liquid state at a temperature below 0° C. This supercooling state ceases for example due to interference, or when the temperature exceeds the associated state-change temperature by a certain value, the material then suddenly assuming this state-change temperature and the change of state then taking place in a conventional manner.

This has the effect of making the solidification and liquefaction temperatures of each material substantially coincide. For example, in practice, the use of bismuth in the bismuth-gallium alloy has the effect of reducing the gallium supercooling phenomenon.

Preferably, the distance between two housings and the distance between a housing and the hole 18 are greater than or equal to 2 mm. This limits the risk of possible cross-contamination of materials through the base and thus ensures stability over time of the state-change temperatures of the materials.

Note that each housing 20, 22, 24 is associated with a plug 20B, 22B, 24B closing the opening of the corresponding housing (only plugs 20B and 24B are illustrated in FIG. 1).

During thermal transfers with device 8, the insulating means 16 are adapted to limit heat loss by the ends of the cell 6, reduce the thermal coupling between the base 12 of the protective sheath 14, and to achieve a uniform temperature within the cell 6. Furthermore, the insulating means 16 are adapted to allow thermal coupling between the base 12 (and therefore the probe 10) and the structure 4, particularly when device 8 is inactive.

The insulating means 16 comprise two insulating blocks 16B. The blocks 16B each have a generally cylindrical shape of the same diameter as the end portions 12E of the base 12 and are each arranged to bear coaxially against one of these portions 12E. In other words, each block 16B extends the base 12 at one of its ends. Note that the block 16B in contact with the face of the base 12 having the hole 18 is pierced to allow the passage of the probe 10.

In addition, the insulating means 16 comprise an insulating jacket 16C. The jacket 16C surrounds the central portion 12C of the base 12 and has a thickness substantially corresponding to the difference between the respective radii of the central portions 12C and the end portion 12E of the base 12. In other words, the base 12 provided with the jacket 16C can be substantially inscribed within a cylinder of a diameter corresponding to the diameter of the end portions 12E. The jacket 16C is adapted for thermally decoupling the base 12 from the protective sheath 14.

The blocks 16B and the jacket 16 are made from a material of low thermal conductivity. For example, they are made from magnesia.

The protective sheath 14 is adapted to encapsulate the base 12 and the insulating means 16 and to protect these members from the outside environment. In particular, the protective sheath 14 is configured for mechanically protecting the base 12, in particular from deformations of the receiving structure 4, and for preventing the introduction of dust and moisture into the base 12. The protective sheath 14 makes placement of the device 2 possible in a lasting and even permanent manner in the structure 4.

The protective sheath 14 is for example made of stainless steel.

The protective sheath 14 is in the form of a layer of material of complementary shape to the shape of the assembly comprising the base 12 and the insulating means 16. The sheath 14 surrounds the base 12 and the insulating means 16.

Note that the sheath 14 has an opening 140 for the passage of means 15 for connecting the probe 10 to the base 12. These connecting means 15 have a neck 15C secured to the block 16B receiving the probe 10 and sealingly engaging with the sheath 14, and a plug 15B sealingly engaging with the neck 15C. The plug 15B is provided with a central passage receiving the probe 10.

Note also that the protective sheath 14 and the base 12 are designed, in particular due to their component materials, to further facilitate the thermal connection between the probe 10 and the structure 4, which facilitates the obtaining of temperature measurements of the structure 4 by the probe 10 and improves the thermal response of the device 2 to the structure 4.

Referring to FIG. 1, the thermal energy transfer device 8 is adapted to induce a change of state of the first, second, and third materials 26, 28, 30, by cooling or heating the cell 6.

The thermal energy transfer device 8 comprises a heating module 44, a cooling module 46, and a heat exchanger 48. Device 8 further comprises interface means 49 for connecting device 8 to the cell 6 and an electrical energy supply system 50.

The heating module 44 is configured to supply heat to the cell 6 and cause the materials 26, 28, 30 to transition from their solid state to their liquid state. The heating module 44 comprises a resistive wire 44F wound around the cell 6.

The resistive wire 44F is for example made from a nickel-chromium alloy arranged in a stainless steel sheath. In addition, the wire 44F has a diameter for example of 0.25 mm.

Preferably, the pitch of the winding formed by the wire 44F is variable along the axis of the cell 6. More specifically, the pitch of the winding around the cell 6 on the central portion of the cell 6 corresponding to the base 12 is higher, that is to say greater, than the pitch of the winding around the ends of the cell 6. These ends having a different pitch correspond for example to all or a portion of the blocks 16B. More specifically, the pitch of the winding at the central portion of the cell is a first value substantially corresponding to a spacing between two successive turns of the wire 44F that is between one and two times the value of the diameter of the wire 44F. In addition, the pitch of the winding around the cell 6 on the end portions of the cell is a second value. This value corresponds for example to a close pitch, meaning that each turn of the wire 44F on this portion is in contact with the adjacent turns.

This configuration has the effect of improving the spatial uniformity of the temperature within the cell 6.

The cooling module 46 is configured to cool the cell 6 and cause the materials 26, 28, 30 to transition from their fluid state to their solid state. The cooling module 46 is arranged under the cell 6.

The cooling module 46 comprises at least one Peltier effect module. In a known manner, such a module has a hot face and a cold face during its operation. The cooling module 46 is oriented so that its cold face is facing the cell 6 and thus lowers the temperature within the cell 6, and in particular the base 12. The hot face is facing the thermal exchanger 48. Note that in the example of FIG. 1, the cooling module comprises a plurality of Peltier effect modules 46A, 46B arranged in this manner.

The heat exchanger 48 is provided for dissipating the heat generated by the cooling module 46 during operation and thus prevents the communication of this heat to the cell 6. The heat exchanger 48 is in contact with the hot side of the cooling module 46.

The heat exchanger 48 comprises a metal member 48M in the form of a bar. This bar is for example rectilinear. This metal member 48M is in contact with the cooling module 46 and is in contact with the structure 4.

The interface means 49 are adapted for mechanically connecting the transfer device 8 to the cell 6 and for thermally connecting the cooling module 46 to the cell 6.

The interface means 49 comprise a connecting piece 49P arranged in contact with the resistive wire 44F on the one hand and with the cooling module 46 on the other. This piece 49P allows heat exchanges by conduction between the cooling module 46 and the cell 6.

In addition, the interface means 49 comprise attaching screws 49V securing the metal member 48M, the cooling module 46, and the connection piece 49P together and in contact with the cell 6.

The electrical energy supply system 50 is configured to supply electrical energy to the heating module 44 and cooling module 46 in order to generate a transfer of thermal energy with the cell 6. In particular, the system 50 is configured to power the heating module 44 and the cooling module so as to generate temperature ramp-ups and ramp-downs.

The electrical energy supply system 50 comprises a power supply 52, a control module 54 configured to control the power supply 52 in order to generate the thermal energy transfers and in particular the temperature ramp-ups and ramp-downs, as well as an electrical energy power source 55. Alternatively or in parallel, the system 50 is connected to an external power source such as a power grid (dashed connection in FIG. 1).

The probe 10 is configured to obtain local temperature measurements, as opposed to distributed temperature measurements. More particularly, the probe 10 is configured to obtain temperature measurements of the receiving structure 4 to which it is thermally connected through the base 12 and the protective sheath 14.

In practice, the probe 10 delivers a signal representative of the temperature, this signal being converted into an actual measured temperature by the acquisition device 11.

The probe 10 has a sensitive main portion 56 provided with a protective sheath 58. The sensitive main portion 56 is engaged in the hole 18 of the base 12. In the example in FIG. 1, the sensitive portion 56 substantially corresponds to the half portion of the probe 10 engaged in the base, more particularly the left half of this portion. The probe 10 further comprises a connection cable 60 connected to the acquisition module 11.

The probe 10 is for example a Pt100 type probe, meaning a probe of which the sensitive main portion 56 is made from platinum and has a precision of about a 100th of a degree. The electrical resistance of the probe is then substantially 100 ohms at 0° C. The probe 10 is for example a class A Pt100 probe, this class quantifying the tolerance of the probe. In addition, for example, the probe 10 has a diameter of about 3 mm, or a diameter of between 3 and 6 mm.

Alternatively, the probe 10 is a thermocouple or a thermistor. In these cases, the probe 10 has a shape similar to that previously described. However, the diameter of the probe is then between 1 and 6 mm and the dimensions of the cell 6 are slightly changed proportionally.

The acquisition module 11 is configured to convert the signals delivered by the probe 10 into temperature measurements, to save those measurements, and permit their retrieval for the purposes of metrological verification of the probe and/or correction of measurements made by the probe 10. The acquisition module 11 has a configurable acquisition frequency. This frequency is for example less than or equal to 2 Hz.

For this purpose, the acquisition module 11 comprises a processing unit 62 configured to convert the signals supplied by the probe 10 into temperature measurements, a memory 64 in which the temperature measurements are saved, and a communication interface 66 for the retrieval of these measurements.

Retrieval of measurements via the communication interface 66 is for example achieved by physical access to the acquisition device 11 or by transmission to a remote device via a network to which the communication interface 66 is connected.

Figure 3:
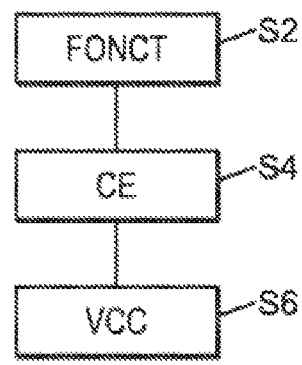
FIG. 3 illustrates a method for using the device for local temperature measurement according to the invention.

A method for using the device 2 will now be described with reference to FIG. 3.

During a functional step S2, the device 2 measures the temperature of the receiving structure 4. To do this, the base 12 exchanges thermal energy with the structure 4 through the protective sheath 14, the insulating means 16, and the base 12, until reaching a thermal equilibrium where the temperature of the base 12 substantially corresponds to the temperature of the structure 4. The probe 10 then measures the temperature of the structure 4. The sensitive portion 56 of the probe 10 then sends, to the acquisition unit 11, a signal representative of the temperature of the structure 4 as measured by the probe 10. The thermal energy transfer device 8 is then inactive. During this step, the temperature acquisition is done for example at a rate of one measurement per hour or less, for example one measurement per day.

During a test step S4, an exchange of thermal energy between the cell 6 and the thermal energy transfer device 8 is carried out, and temperature measurements are obtained using the probe 10.

Specifically, a change of state is caused in the first, second, and third materials 26, 28, 30 by using the thermal energy transfer device 8. For this purpose, the thermal energy transfer device 8 is controlled to apply at least one temperature ramp-up or ramp-down corresponding to a temperature range including the fixed state-change temperatures T1, T2, and T3. In parallel, during this heat exchange the measurements provided by the probe 10 are stored in the acquisition device 11. These stored measurements include temperature measurements obtained during the respective state changes of the three materials 26, 28, 30. Note that during this step, the measurements are acquired at a frequency substantially equal to 2 Hz.

Figure 4:
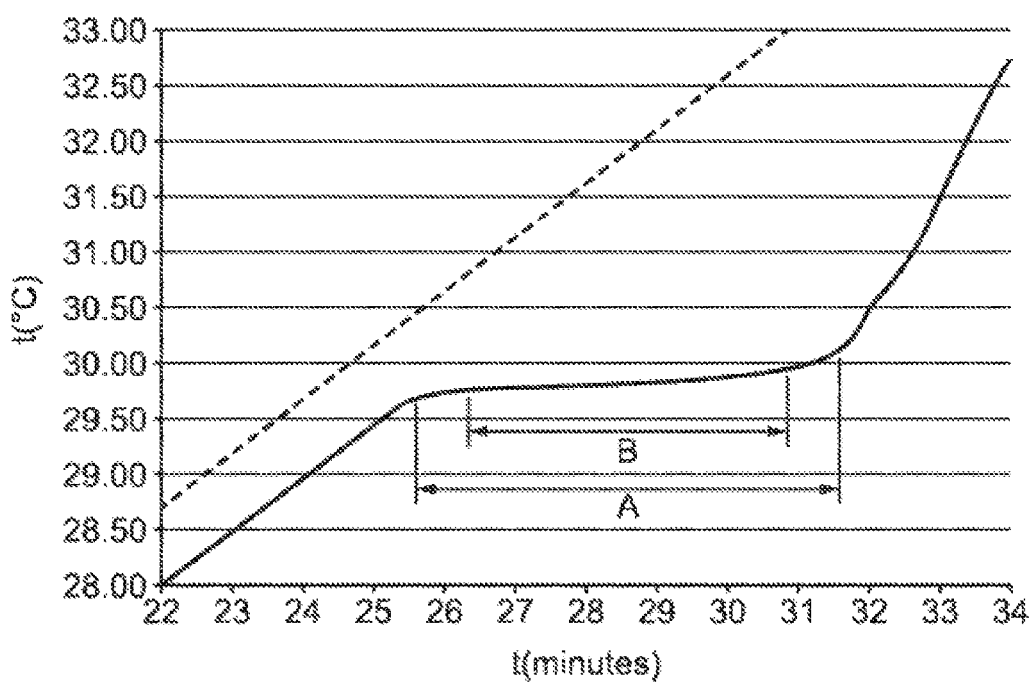
FIG. 4 illustrates a temperature ramp-up and a temperature measurement curve obtained by the device for local temperature measurement of FIG. 1.

FIG. 4 illustrates a portion of a temperature ramp-up (upper curve) implemented during test step S4. FIG. 4 provides a more precise illustration of a temperature range within which the fixed state-change temperature T2 of the second material is situated. Note that this upper curve corresponds to the temperature that would be measured in the vicinity of the thermal energy transfer device 8 in the absence of the cell 6. This FIG. 4 also illustrates the corresponding portion of the curve of temperatures measured by the probe 10 (lower curve) for this part of the temperature ramp-up.

As illustrated in this Figure, the change of state of one of the materials 26, 28, 30 causes a temperature plateau which can be seen in the curve of measurements obtained via the probe 10. This temperature plateau occurs exactly when the temperature of the cell 6 reaches the fixed state-change temperature of the material concerned, which is material 28 in the example in FIG. 4. This is explained by the fact that the change of state occurs at a substantially fixed temperature under the effect of the thermal energy transfer imposed by the thermal energy transfer device 8.

Note that FIG. 4 shows a portion of a temperature ramp-up, meaning that the cell 6 is being heated so as to cause the desired change of state(s).

However, it is also conceivable to previously, subsequently, or alternatively cool the cell 6, which is also adapted to cause a change of state of the materials 26, 28, 30 (in this case to the solid state). For example, in this step, heating and cooling are sequentially applied in any order, this sequence possibly being repeated.

In addition, in some embodiments, at the beginning of test step S4, a thermal exchange between the cell and the thermal energy transfer device 8 is implemented so as to bring the cell 6 to a default temperature. The default temperature is selected, for example, to be less than the lowest fixed state-change temperature among the three temperatures (here, temperature T1) or greater than the highest temperature (here T3). This ensures that the heating, respectively cooling, of the cell 6 causes a change of state of each of the materials 26, 28, 30.

Following step S4, in a processing step S6, a metrological verification of the probe 10 and/or a measurement correction of the probe 10 is carried out based on one or more fixed state-change temperatures of the materials 26, 28, 30 and on temperatures measured by the probe 10 during test step S4.

For the metrological verification of the probe 10, the fixed state-change temperature of one of the materials 26, 28, 30, which is known per se, is compared to the state-change temperature determined from measurements made by the probe 10 and which corresponds to the temperature at which the associated temperature plateau was formed.

For example, with reference to FIG. 4, the state-change temperature is determined from measurements made by the probe 10 as follows.

During a first processing, the derivative of the measurements made by the probe 10 is calculated at each point of the curve. This derivative is for example in ° C./min. From these derivatives, the duration of the change of state of the material 26, 28, 30 concerned is determined by isolating the moment at which the derivative drops sharply (change of state start time) and the moment at which the derivative increases sharply (change of state end time). The range A in FIG. 4 corresponds to the times between the change of state start time and end time so determined. The difference between these two times provides the duration of the change of state. Next, the temperature of the change of state indicated by the probe is determined as the average temperature measured by the probe during the change of state.

In some embodiments, for the determination of this state-change temperature, we only retain the temperature values from range A which have derivatives all substantially of the same minimum value, or else are less than a predetermined value. These values correspond to the temperatures in range B. The existence of different derivative values of the temperature during the change of state is due to the fact that at the start and end of the change of state, transient phenomena occur. These phenomena appear as a temporary variation in the value of the temperature derivative before the temperature stabilizes around a minimum value. This alternative allows obtaining a more precise state-change temperature as measured than before, as these transient phenomena are then excluded from the measurements used.

The observed difference between the state-change temperature determined from measurements of the probe 10, and the fixed state-change temperature that is known per se, provides the drift of the probe 10.

For correcting the measurement of the probe 10, this comparison is made between the fixed state-change temperature as is and the state-change temperature determined from measurements of the probe 10 for two different materials, for example for the first and second materials 26, 28, or for the second and third materials 28, 30. The observed differences between the fixed state-change temperatures known per se and the measured state-change temperatures allow correcting the measurements provided by the probe 10.

In practice, for correcting a measurement, it is assumed that the drift of the probe is linear. To obtain a corrected temperature, a corrective term determined from the change in drift provided by the measured state-change temperatures is added to the temperature measured by the probe.

The device 2 according to the invention has been implemented for different temperatures of the structure 4 (readings substantially constant over time), in particular 15° C., 20° C., 25° C., 30° C., and 35° C., for a probe 10 having negligible drift.

The obtained results are summarized in the following table. Note that the temperatures "T of Ga—Bi state change" and "T of Bi—In state change" are temperatures determined from measurements made during the state changes of the second and third materials 28, 30 as described above. Furthermore, in cases where the temperature of the structure 4 is greater than the state-change temperature of Ga—Bi, the cell was initially cooled by the cooling module 46 to a temperature of 15° C.

In addition, the applied temperature ramp-up was 0.5° C./min between 15° C. and 80° C.

| Temp of structure | T of Ga—Bi state change | T of Bi—In state change |
| --- | --- | --- |
| 15° C. | 29.90° C. | 72.88° C. |
| 20° C. | 29.85° C. | 72.90° C. |
| 25° C. | 30.10° C. | 72.86° C. |
| 30° C. | 29.92° C. | 72.91° C. |
| 35° C. | 29.99° C. | 72.65° C. |

Other embodiments are conceivable. In particular, the above description was given for the case of a device 2 comprising three different materials 26, 28, 30 which are induced to change state.

However, in some embodiments, the device 2 only comprises two materials, for example the first and second materials 26, 28, or the second and third materials. The device 2 also allows for metrological verification of the probe 10 as well as correction of the measurements provided by the probe 10.

Furthermore, alternatively, the device 2 comprises only a single fixed point, for example material 26. The device 2 then only allows carrying out metrological verification of the probe 10.

In addition, in some embodiments, the device 2 comprises more than three materials 26, 28, 30.

Moreover, in some embodiments for which it is not necessary to cool the cell, the device 8 comprises only the heating module 44. This embodiment is advantageous in conditions where the structure 4 has a temperature low enough to bring by itself at least one, possibly two, possibly three materials 26, 28, 30 to a solid state when the heating means are not enabled.

In addition, with reference to FIG. 5, additionally or alternatively the heat exchanger comprises a metal grid 48G. This grid is for example a mesh made from copper wires. These wires have for example a diameter of 4 mm. The grid 48G is used to replace the metal member 48M, or is in addition to the metal member 48M. Note that in the case where the device 2 comprises both the metal member 48M and the grid 48G, the dimensions of the metal member, and in particular its length, may be reduced. This facilitates integration of the device 2 into the structure 4.

Note that the dimensions of the grid 48G are predetermined based on the nature of the structure 4 and/or the temperature range within which the temperature of the structure 4 varies.

In another variant, also with reference to FIG. 5, the heat exchanger 48 also comprises one or more spacers 48I (FIG. 5) arranged between the cooling module 46 and the metal member 48M. These spacers increase the distance of the exchanger and the metal member 48M from the cell 6 and further reduce the thermal coupling between the cooling module 46 and the cell 6.

These parts are made from a material having low thermal conductivity, for example magnesia, for example in powder form or in the form of a machined block.

Alternatively, still with reference to FIG. 5, the device 2 also comprises an insulating material 68 arranged in the gaps of the heat exchanger 48 and interface means 49. In particular, the insulating material 68 is arranged in contact with the attaching screws 49V and insulates them from the structure 4, cooling module 46, and spacers 48I. This insulating material 68 comprises for example a PVC type of insulating polymer or a polyamide or a mica type of insulating material.

Note that FIG. 5 illustrates an embodiment in which these last three variants are combined. However, these variants may be implemented independently of each other.

Note that a particularly interesting advantage of the device 2 of the invention is that it allows a sufficiently good thermal connection between the probe 10 and the structure 4 to enable the probe 10 to measure the temperature of the structure 4 with good thermal response, while not preventing the application of temperature ramp-ups and ramp-downs perceived by the probe 10 within the cell 6 for the measurement of temperatures at which the state changes of the fixed-point materials occur. As described above, this results from dimensional considerations of the cell, in particular concerning the dimensions of the probe 10, the materials of the members of the cell 6, and the presence of insulating means 16.

The invention claimed is:

1. A device for local temperature measurement that is suitable for obtaining temperature measurements of the immediate vicinity of the device, the device comprising:
    a cell comprising a thermally conductive base, the base having a generally cylindrical shape, and a first material having a predetermined fixed state-change temperature and arranged in the base,
    a thermal energy transfer device thermally connected to the base and to the first material,
    a local temperature measurement probe received in the base and in thermal contact with the first material,
    the thermal energy transfer device being adapted to cause a change of state of the first material in order to carry out at least one metrological verification of the local temperature measurement probe,
    wherein the device further comprises thermal insulating means configured for maintaining a uniform temperature within the cell, and
    wherein the thermal insulating means comprises at least one block bearing against an end face of the base.

2. The device according to claim 1, wherein the cell comprises a protective sheath encapsulating the base, so that the device for local temperature measurement is adapted to be received in a lasting manner in a receiving structure and to be inaccessible within said receiving structure.

3. The device according to claim 1, wherein the cell thermally connects the local temperature measurement probe to said immediate vicinity so that the cell enables the obtaining of temperature measurements representative of the temperature of said immediate vicinity, by the local temperature measurement probe received in the base.

4. The device according to claim 1, wherein the thermal energy transfer device comprises a cooling module and a heat exchanger configured to remove heat generated by the cooling module during operation of the cooling module.

5. The device according to claim 1, wherein the insulating means comprise an insulating jacket surrounding a central portion of the base.

6. The device according to claim 1, wherein the device is adapted to enable metrological verification of the local temperature measurement probe based on temperatures measured by the local temperature measurement probe during the change of state of said first material and on said predetermined fixed state-change temperature.

7. The device according to claim 6, wherein the device further comprises a second material arranged in the base and having at least a first, respectively a second predetermined fixed state-change temperature, the thermal energy transfer device being adapted to cause a change of state of the first and second materials, the device for local temperature measurement being adapted to allow correcting temperature measurements provided by the local temperature measurement probe based on temperatures measured by the local temperature measurement probe during respective state changes of the first and second materials and on the first and second predetermined fixed state-change temperatures.

8. The device according to claim 1, wherein the device comprises a heating module comprising a resistive wire wound around the cell.

9. The device according to claim 8, wherein the resistive wire defines a winding having a variable pitch along an axis of the cell.

10. The device according to claim 8, wherein the winding has a pitch equal to a first value over a central portion of the cell and a second value, less than the first value, over end portions of the cell.

11. A cell arranged to form the cell of the device for local temperature measurement according to claim 1, the cell comprising a thermally conductive base, the base having a generally cylindrical shape, at least one housing for receiving a first material having a predetermined fixed state-change temperature, and a hole for receiving the local temperature measurement probe of said device,
    wherein the cell further comprises thermal insulating means configured for maintaining a uniform temperature within the cell, and
    wherein the thermal insulating means comprise at least one block bearing against one of the end faces of the base.

12. The cell according to claim 11, wherein the cell comprises a protective sheath encapsulating the base, such that the device for local temperature measurement is adapted to be received in a lasting manner in a receiving structure and to be inaccessible within said receiving structure.

13. A method for using the device for local temperature measurement according to claim 1, wherein:
    a change of state of the first material is caused by the thermal energy transfer device,
    temperature measurements are carried out during said change of state, using the local temperature measurement probe,
    a measured state-change temperature is determined based on temperature measurements measured during said change of state, and
    a metrological verification of the local measurement probe or a correction of a temperature measurement obtained by the local temperature measurement probe is carried out based on at least the predetermined fixed state-change temperature and the determined measured state-change temperature.

14. The method for using the device for local temperature measurement according to claim 13, wherein:
    the device further comprises a second material arranged in the base and having at least a first, respectively a second predetermined fixed state-change temperature, the thermal energy transfer device being adapted to cause a change of state of the first and second materials, the device for local temperature measurement being adapted to allow correcting temperature measurements provided by the local temperature measurement probe based on temperatures measured by the local temperature measurement probe during respective state changes of the first and second materials and on the first and second predetermined fixed state-change temperatures,
    a change of state of the second material of the device is also caused by the thermal energy transfer device, temperature measurements are also carried out during the change of state of the second material using the local temperature measurement probe, a measured state-change temperature is determined for the second material, based on temperatures measured during the change of state of the second material, a correction of a measurement obtained by the local temperature measurement probe is carried out based on predetermined fixed state-change temperatures of the first material and the second material and the measured change temperatures of the first and second materials.

15. The method for using the device according to claim 13, wherein, for the determination of a measured state-change temperature, a derivative of the temperatures measured by the local temperature measurement probe during the change of state is determined, start and end times of the change of state are determined from the derivative of the temperatures measured, and the measured state-change temperature is determined as the average of the temperatures measured by the local temperature measurement probe between the start and end times of the change of state.

* * * * *